(12) United States Patent
Kang et al.

(10) Patent No.: US 11,021,367 B2
(45) Date of Patent: Jun. 1, 2021

(54) LITHIUM COMPOSITE PHOSPHATE-BASED COMPOUND AND PREPARATION METHOD THEREFOR

(71) Applicant: SK INNOVATION CO., LTD., Seoul (KR)

(72) Inventors: Min Gu Kang, Daejeon (KR); Seong Ho Lee, Daejeon (KR); Jung In Yeon, Daejeon (KR); Kook Hyun Han, Daejeon (KR); Jung Hwan Kim, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 65 days.

(21) Appl. No.: 16/540,765

(22) Filed: Aug. 14, 2019

(65) Prior Publication Data

US 2019/0367367 A1   Dec. 5, 2019

Related U.S. Application Data

(62) Division of application No. 15/039,363, filed as application No. PCT/KR2013/010795 on Nov. 26, 2013, now Pat. No. 10,421,664.

(51) Int. Cl.
*C01B 25/30* (2006.01)
*H01M 4/58* (2010.01)
(Continued)

(52) U.S. Cl.
CPC .............. *C01B 25/30* (2013.01); *C01D 15/02* (2013.01); *C01F 5/00* (2013.01); *C01F 7/002* (2013.01);
(Continued)

(58) Field of Classification Search
None
See application file for complete search history.

(56) References Cited

U.S. PATENT DOCUMENTS

2013/0153821 A1* 6/2013 Evenson ............... H01M 4/136
252/182.1

FOREIGN PATENT DOCUMENTS

| CN | 101383409 A | 3/2009 |
| CN | 102148374 A | 8/2011 |

(Continued)

OTHER PUBLICATIONS

English translation of KR 2013/0066770 (Year: 2013).*

*Primary Examiner* — Yoshitoshi Takeuchi
(74) *Attorney, Agent, or Firm* — IP & T Group LLP (57) ABSTRACT

Provided is a porous lithium composite phosphate-based compound containing lithium and having open pores formed in primary particles. As the open pores are formed in the primary particles themselves, a contact area between an electrolyte and the lithium composite phosphate-based compound is maximized, and low conductivity is compensated for, such that a diffusion rate of lithium ions is remarkably increased, and when the lithium composite phosphate-based compound is used as an active material of a secondary battery, the secondary battery may be charged and discharged at a high speed. Additionally, there are advantages in that an electrode density may be significantly increased in addition to the increase in the diffusion rate of the lithium ions, and charge and discharge cycle characteristics may be significantly stable.

11 Claims, 6 Drawing Sheets

(51) Int. Cl.
  *C01D 15/02* (2006.01)
  *C01F 5/00* (2006.01)
  *C01F 7/00* (2006.01)
  *C01F 11/02* (2006.01)
  *H01M 4/13* (2010.01)
  *H01M 4/36* (2006.01)
  *H01M 4/38* (2006.01)
  *H01M 4/40* (2006.01)
  *H01M 10/052* (2010.01)

(52) U.S. Cl.
  CPC ............... *C01F 11/02* (2013.01); *H01M 4/13* (2013.01); *H01M 4/362* (2013.01); *H01M 4/382* (2013.01); *H01M 4/405* (2013.01); *H01M 4/5825* (2013.01); *H01M 10/052* (2013.01)

(56) References Cited

FOREIGN PATENT DOCUMENTS

| | | | | |
|---|---|---|---|---|
| KR | 10-2010-0044713 A | | 4/2010 | |
| KR | 10-2010-0103429 A | | 9/2010 | |
| KR | 2013/0066770 | * | 6/2013 | ............. C01B 25/45 |

* cited by examiner

LITHIUM COMPOSITE PHOSPHATE-BASED COMPOUND AND PREPARATION METHOD THEREFOR

This application is a division of U.S. patent application Ser. No. 15/039,363 filed on May 25, 2016, which is a national stage application of PCT/KR2013/010795 filed on Nov. 26, 2013. The disclosure of each of the foregoing applications is herein incorporated by reference in its entirety.

TECHNICAL FIELD

The present invention relates to a lithium composite phosphate-based compound, uses thereof, and a preparation method therefor.

BACKGROUND ART

A lithium phosphate-based compound has significantly excellent stability due to a structural feature even in a case in which short-circuit or over-heating of a battery occurs. A lithium phosphate iron-based compound having an olivine structure may be prepared using a cheap raw material and have high bulk density and excellent thermal stability and life characteristics, such that the lithium phosphate iron-based compound has been commercialized as a cathode active material.

However, in a lithium composite phosphate salt having an olivine structure, lithium ions may be diffused only in one direction, such that research for improving a diffusion rate of lithium has been conducted as in International Patent NO. WO11/132930.

DISCLOSURE

Technical Problem

An object of the present invention is to provide a lithium composite phosphate-based compound suitable for a cathode active material of a secondary battery and a preparation method therefor. More particularly, the object of the present invention is to provide a lithium composite phosphate-based compound capable of significantly increasing a diffusion rate of lithium ions and having significantly high tap density in addition to an increase in diffusion rate of the lithium ions and a preparation method therefor.

Technical Solution

In one general aspect, a lithium composite phosphate-based compound contains lithium and includes a porous lithium composite phosphate-based compound having open pores formed in primary particles.

A Brunauer-Emmett-Teller (BET) specific surface area of the primary particle may be 25 to 50 m²/g.

A pore volume of the primary particle may be 0.1 to 0.25 cm³/g.

The primary particle may contain nano pores having an average pore size of 1 to 5 nm.

The primary particle may contain at least pores having a bimodal size distribution.

The lithium composite phosphate-based compound may have a composition represented by the following Chemical Formula 1.

$$Li_{1+a}Fe_{1-x}M_xP_{1+b}O_4 \quad \text{(Chemical Formula 1)}$$

(In Chemical Formula 1, M is one or more selected from the group consisting of Mg, Ni, Co, Mn, Ti, Cr, Cu, V, Ce, Sn, Ba, Ca, Sr, Zn, Al, and Ag, and x, a, and b are real numbers satisfying 0.00≤x≤1, 0.00≤a≤0.1, and 0.00≤b≤0.10, respectively.)

A size of the primary particle may be 10 nm to 200 μm.

The lithium composite phosphate-based compound may be a cathode active material for a secondary battery.

In another general aspect, a cathode active material for a secondary battery contains the lithium composite phosphate-based compound as described above.

A carbon coating layer may be formed on a surface of the primary particle of the lithium composite phosphate-based compound, wherein the surface of the primary particle may include a surface by the open pore.

The cathode active material may further contain 2 to 6 parts by weight of carbon based on 100 parts by weight of the primary particle of the lithium composite phosphate-based compound.

In another general aspect, a cathode for a secondary battery contains the cathode active material as described above.

In another general aspect, a lithium secondary battery contains the cathode as described above.

In another general aspect, a preparation method for a lithium composite phosphate-based compound includes: a) injecting and stirring at least a chelating agent, a precursor of phosphate, a precursor of a first metal including lithium, and a water-insoluble precursor of a second metal in a polar solvent to prepare a precursor dispersion solution; and b) heat-treating precursor powder obtained by concentrating and drying the precursor dispersion solution.

The second metal may be one or two or more metals selected among transition metals, and in the water-insoluble precursor of the second metal, the second metal may have a valence of 2 (+2).

The precursor powder may contain a complex of the second metal having a valence of 3.

The precursor of the first metal may be a water-soluble precursor or a water-insoluble precursor.

The second metal may include iron.

A water-soluble precursor of a third metal, one or more metals selected among Mg, Ni, Co, Mn, Ti, Cr, Cu, V, Ce, Sn, Ba, Ca, Sr, Zn, Al, and Ag may be further injected into the polar solvent.

The lithium composite phosphate-based compound may include a phosphate satisfying a composition represented by the following Chemical Formula 1.

$$Li_{1+a}Fe_{1-x}M_xP_{1+b}O_4 \quad \text{(Chemical Formula 1)}$$

(In Chemical Formula 1, M is one or more selected from the group consisting of Mg, Ni, Co, Mn, Ti, Cr, Cu, V, Ce, Sn, Ba, Ca, Sr, Zn, Al, and Ag, and x, a, and b are real numbers satisfying 0.00≤x≤1, 0.00≤a≤0.1, and 0.00≤b≤0.10, respectively.)

The concentration and drying may be performed by vacuum concentration.

The vacuum concentration may be performed at a temperature of 30 to 60° C. and a pressure of 20 to 100 mbar.

The heat-treatment may be performed under a reduction atmosphere or an inert atmosphere.

The heat-treatment may be performed at 400 to 800° C.

Advantageous Effects

In a lithium composite phosphate-based compound according to the present invention, as open pores are formed in primary particles themselves, a contact area between an electrolyte and the lithium composite phosphate-based compound may be maximized, and lower conductivity may be compensated for, such that a diffusion rate of lithium ions may be remarkably increased.

As a secondary battery containing a lithium composite phosphate-based compound according to the present invention contains a lithium composite phosphate-based compound having open pores formed in primary particles themselves, the secondary battery may be charged and discharged at a high speed. In addition, as the primary particles of the lithium composite phosphate-based compound have a size of several ten nanometers to several hundred micrometers and the open pores are formed, the battery may have advantages in that an electrode density may be remarkably increased in addition to an increase in the diffusion rate of the lithium ions, and charge and discharge cycle characteristics may be significantly stable.

A preparation method for a lithium composite phosphate-based compound according to the present invention has advantages in that a lithium composite phosphate-based compound having a porous structure in which open pores are formed in primary particles may be prepared by a simple process of mixing and stirring a chelating agent and a precursor of each of the metals of a desired composition with each other, and then concentrating, drying, and heat-treating the resultant, and a porous lithium composite phosphate-based compound having a uniform quality may be mass-produced under mild process conditions.

BEST MODE

Hereinafter, a lithium composite phosphate-based compound according to the present invention, uses thereof, and a preparation method therefor will be described in detail with reference to the accompanying drawings. Here, technical terms and scientific terms used in the present specification have the general meaning understood by those skilled in the art to which the present invention pertains unless otherwise defined, and a description for the known function and configuration obscuring the present invention will be omitted in the following description.

The lithium composite phosphate-based compound according to the present invention contains a phosphate salt containing lithium, and may contain a phosphate salt containing lithium and one or more metal elements except for lithium.

The lithium composite phosphate-based compound according to the present invention may be a porous lithium composite phosphate-based compound containing at least lithium and having open pores formed in primary particles.

The lithium composite phosphate-based compound according to the present invention may have a significantly rapid diffusion rate of Li ions while having a specific surface area significantly increased due to formation of the open pores in the primary particles themselves.

In the lithium composite phosphate-based compound according to an exemplary embodiment of the present invention, the primary particle may mean a crystal particle.

In the lithium composite phosphate-based compound according to the exemplary embodiment of the present invention, the open pore may mean a pore having an opening formed on a surface of the primary particle, and a pore of which an interior of a pore formed in the primary particle is filled with a liquid including an electrolyte through the opening.

The lithium composite phosphate-based compound according to the exemplary embodiment of the present invention may have a composition represented by the following Chemical Formula 1.

$$Li_{1+a}Fe_{1-x}M_xP_{1+b}O_4 \quad \text{(Chemical Formula 1)}$$

In Chemical Formula 1, M is one or more selected from the group consisting of Mg, Ni, Co, Mn, Ti, Cr, Cu, V, Ce, Sn, Ba, Ca, Sr, Zn, Al, and Ag, and x, a, and b are real numbers satisfying $0.00 \leq x \leq 1$, $0.00 \leq a \leq 0.10$, and $0.00 \leq b \leq 0.10$, respectively.

The lithium composite phosphate-based compound according to the exemplary embodiment of the present invention may have a composition represented by the following Chemical Formula 1-1.

$$Li_{1+a}Fe_{1-x}M_xP_{1+b}O_4 \quad \text{(Chemical Formula 1-1)}$$

In Chemical Formula 1-1, M is one or more selected from the group consisting of Mg, Ni, Co, Mn, Ti, Cr, Cu, V, Ce, Sn, Ba, Ca, Sr, Zn, Al, and Ag, and x, a, and b are real numbers satisfying $0.00 \leq x < 1$, $0.00 \leq a \leq 0.10$, and $0.00 \leq b \leq 0.10$, respectively.

In the lithium composite phosphate-based compound according to the exemplary embodiment of the present invention represented by the following Chemical Formula 1 or 1-1, M may be one or two or more metals selected among transition metals including Ni, Co, Mn, Ti, Cr, Cu, V, Zn, and Ag; and alkali earth metals including Ca, Sr, Ba, and Mg; M may be one or two or more metals selected among the transition metals including Ni, Co, Mn, Ti, Cr, Cu, V, Zn, and Ag; or M may be one or two or more metals selected from the alkali earth metals including Ca, Sr, Ba, and Mg.

In the lithium composite phosphate-based compound according to the exemplary embodiment of the present invention, a Brunauer-Emmett-Teller (BET) specific surface area of the primary particle may be 25 to 50 m²/g, and more preferably, 30 to 50 m²/g.

In the lithium composite phosphate-based compound according to the exemplary embodiment of the present invention, a pore volume of the primary particle may be 0.1 to 0.25 cm$^3$/g, more preferably, 0.14 to 0.25 cm$^3$/g. The pore volume of the primary particle may mean a volume of the pore (open pore) per unit mass of the primary particle.

In the lithium composite phosphate-based compound according to the exemplary embodiment of the present invention, the primary particle may contain a nano pore having an average pore size of 1 to 5 nm.

In the lithium composite phosphate-based compound according to the exemplary embodiment of the present invention, the primary particle may contain at least pores having a bimodal size distribution. The pores having a bimodal size distribution may include a nano pore having an average pore size of 1 to 5 nm and a sub-micro pore having an average pore size of 10 to 30 nm.

In the pores having the bimodal size distribution, a volume ratio of the nano pore and the sub-micro pore may be 100:10 to 80.

In this case, sizes and distribution of the pores present in the primary particle may be measured by a general BET method using physical adsorption.

In the lithium composite phosphate-based compound according to the exemplary embodiment of the present invention, a size (diameter) of the primary particle may be 10 nm to 200 μm, specifically, 1 μm to 200 μm, and more specifically, 5 μm to 200 μm.

In the lithium composite phosphate-based compound according to the exemplary embodiment of the present invention, the primary particle has the size as described above while having open pores formed therein, such that a diffusion rate of the lithium ion may be significantly increased, a current density may be increased to 1.0 g/cc or more, and charge/discharge cycle characteristics may be significantly stable.

As a substantial example, in a case of a lithium secondary battery including a cathode containing primary particles having a size of 1 to 200 μm, a change in battery capacity (mAhg$^{-1}$) at 28th cycle based on battery capacity (mAhg$^{-1}$) at 1st cycle (battery capacity at 28th cycle/battery capacity at 1st cycle×100%) (charge and discharge condition: 4.3-2.5V, 0.1 C) may be maintained to 99.95% or more.

The lithium composite phosphate-based compound according to the exemplary embodiment of the present invention may be a cathode active material for a secondary battery. In this case, the secondary battery may include a lithium ion secondary battery or a lithium polymer secondary battery.

The present invention includes a cathode active material for a secondary battery, containing the lithium composite phosphate-based compound as described above. In this case, the secondary battery may include a lithium ion secondary battery or a lithium polymer secondary battery.

The cathode active material for a secondary battery according to the present invention contains the lithium composite phosphate-based compound having the open pores formed in the primary particles themselves, in a case in which the lithium composite phosphate-based compound is a coarse particle, the battery may be charged and discharged at a high speed, an electrode density in addition to the diffusion rate of the lithium ions may be significantly increased, and charge and discharge cycle characteristics may be significantly stable.

In the cathode active material according to the exemplary embodiment of the present invention, a carbon coating layer may be formed on a surface of the primary particle of the lithium composite phosphate-based compound as described above. The carbon coating layer may be a continuous layer or a discontinuous layer. The carbon coating layer may be formed on at least some region of the surface of the primary particle, or the entire region of the surface of the primary particle. Here, the surface of the primary particle may include a surface by the open pore.

The cathode active material according to the exemplary embodiment of the present invention may contain 2 to 6 parts by weight of the carbon as a coating layer based on 100 parts by weight of the primary particle of the lithium composite phosphate-based compound as described above. Carbon contained in the cathode active material may form the coating layer at least partially covering the surface of the primary particle. Carbon contained in the cathode active material may be a carbon particle or carbon fiber physically attached to the primary particle. Carbon contained in the cathode active material may be a carbon particle and/or carbon fiber mixed with the primary particle.

The present invention includes a cathode for a secondary battery, containing the cathode active material as described above. In this case, the secondary battery may include a lithium ion secondary battery or a lithium polymer secondary battery.

The cathode according to an exemplary embodiment of the present invention may include a current collector and an active material layer formed on at least one surface of the current collector and containing the cathode active material as described above.

The present invention includes a secondary battery provided with the cathode as described above.

The secondary battery according to the exemplary embodiment of the present invention may include a lithium ion secondary battery or a lithium polymer secondary battery, and further include an anode, an electrolyte, and a separator in addition to the above-mentioned cathode.

In this case, the anode may contain an anode active material generally used in the secondary battery, and an example of the anode active material may include one or two or more selected among carbon, graphite, silicon, lithium titanium oxide (LTO), and composites thereof.

Here, the electrolyte may include a non-aqueous electrolyte generally used in the secondary battery, and an example of the electrolyte may include a liquid electrolyte in which a lithium salt including lithium perchlorate, lithium fluoroborate, or lithium hexafluorophosphate, is dissolved in a solvent, and an example of the solvent may include ester-based solvents including propylene carbonate, ethylene carbonate, dimethyl carbonate, and ethylmethyl carbonate.

Here, the separator may include a separator generally used in the secondary battery in order to prevent a short-circuit between the anode and the cathode in the secondary battery, and serve to support the electrolyte. An example of the separator may include a microporous membrane containing polyethylene, polypropylene, or polyolefin, and have a stacking structure in which organic membranes such as a plurality of polyethylene membranes, polypropylene membranes, non-woven fabrics, and the like, are stacked in order to prevent an over-current, maintain the electrolyte, and improve physical strength.

A preparation method for a lithium composite phosphate-based compound according to the present invention may include: a) injecting and stirring at least a chelating agent, a precursor of phosphate, a precursor of a first metal including lithium, and a water-insoluble precursor of a second metal in a polar solvent to prepare a precursor dispersion solution;

and b) heat-treating precursor powder obtained by concentrating and drying the precursor dispersion solution.

In the preparation method according to an exemplary embodiment of the present invention, the first and second metals are metals contained in the desired lithium composite phosphate-based compound, and the first and second metals may be metals equal to or different from each other.

As described above, in the preparation method according to the exemplary embodiment of the present invention, a metal phosphate salt may be prepared by using the water-insoluble precursor of the metal and the chelating agent while preparing a liquid precursor material containing the precursor of the metal and the precursor of phosphate of the desired lithium composite phosphate-based compound, concentrating and drying the precursor dispersion solution to prepare the precursor powder, and heat-treating the precursor powder, thereby making it possible to prepare a metal phosphate salt having a porous structure in which open pores are formed in primary particles. That is, in the preparation method according to the exemplary embodiment of the present invention, the porous lithium composite phosphate-based compound in which the open pores are formed in the primary particles may be prepared using the water-insoluble precursor of the metal, which is not dissolved in the polar solvent but maintains a solid phase.

In the preparation method according to the exemplary embodiment of the present invention, in a case in which the chelating agent and the precursor of phosphate, and selectively, the precursor of the first metal are water-soluble, as the polar solvent, any solvent having a polarity may be used as long as the precursor of the first metal together with the chelating agent and the precursor of phosphate is dissolved therein. As a substantial example, the polar solvent may include water, lower-alcohols having 1 to 5 carbon atoms, acetone, formamide, diformamide, acetonitrile, tetrahydrofuran, dimethylsulfoxide, α-terpineol, β-terpineol, dihydroterpineol, or mixtures thereof.

In the preparation method according to the exemplary embodiment of the present invention, as the chelating agent, any organic material may be used as long as it is dissolved in the polar solvent and forms a complex with the first metal and/or the second metal. As a substantial example, the chelating agent may include an organic acid forming a complex with the first metal and/or the second metal, wherein the organic acid may contain one or two or more material selected among citric acid, acetic acid, succinic acid, malonic acid, malic acid, oxalic acid, propionic acid, tartaric acid, lactic acid, pyruvic acid, and fumaric acid.

In the preparation method according to the exemplary embodiment of the present invention, 5 to 20 parts by weight, preferably, 10 to 15 parts by weight of the chelating agent may be injected based on 100 parts by weight of the polar solvent.

In the preparation method according to the exemplary embodiment of the present invention, the precursor of the first metal may be a water-soluble precursor or a water-insoluble precursor.

In the preparation method according to the exemplary embodiment of the present invention, the precursor of the first metal may be a water-soluble precursor dissolved in the polar solvent including water. As a substantial example, the precursor of the first metal may include a precursor having a water-solubility of 1 g or more, more substantially, 10 g or more, and further more substantially, 53 g or more, based on 100 g of water at room temperature (25° C.) and normal pressure (1 atm).

In the preparation method according to the exemplary embodiment of the present invention, the precursor of the first metal may be a salt (including a hydrate) containing the first metal, which is dissolved in the polar solvent including water, or a complex in which an organic ligand is coordinated with the first metal. As a substantial example, the precursor of the first metal may include one or two or more materials selected among nitrates, sulfates, acetates, citrates, chlorides, sulfites, chloride salts, bromide salts, and iodide salts of the first metal, and hydrates thereof.

In the preparation method according to the exemplary embodiment of the present invention, the precursor of the first metal may be a water-insoluble precursor that is not dissolved in the polar solvent including water. As a substantial example, the precursor of the first metal may have a water-solubility equal to or less than a detection standard of a measurement device, or a water-solubility of substantially 0.034 g or less, and more substantially 0.008 g or less, based on 100 g of water at room temperature (25° C.) and normal pressure (1 atm).

In the preparation method according to the exemplary embodiment of the present invention, the precursor of the first metal may be a salt containing the first metal that is not dissolved in the polar solvent including water or a complex in which an organic ligand is coordinated with the first metal. As a substantial example, the precursor of the first metal may include one or two or more materials selected among phosphates, carbonates, hydroxides, and fluorides of the first metal.

In the preparation method according to the exemplary embodiment of the present invention, the water-insoluble precursor of the second metal may be a precursor of the second metal that is not dissolved in the polar solvent including water. As a substantial example, the water-insoluble precursor (including the water-insoluble precursor of the second metal) may include a precursor having a water-solubility equal to or less than a detection standard of a measurement device or less, or a water-solubility of substantially 0.034 g or less, and more substantially, 0.008 g or less, based on 100 g of water at room temperature (25° C.) and normal pressure (1 atm).

In the preparation method according to the exemplary embodiment of the present invention, the water-insoluble precursor of the second metal may be a salt containing the second metal or a complex in which an organic ligand is coordinated with the second metal, which is not dissolved in the polar solvent including water. As a substantial example, the water-insoluble precursor of the second metal may include oxalates, acetates, nitrates, or sulfates of the second metal, or mixtures thereof.

In the preparation method according to the exemplary embodiment of the present invention, an average particle size of the water-insoluble precursor of the second metal may be 1 μm to 50 μm, specifically, 1 μm to 30 μm, and more specifically, 3 μm to 18 μm.

In the preparation method according to the exemplary embodiment of the present invention, the second metal may be one or two or more metals selected among transition metals, and in the water-insoluble precursor of the second metal, the second metal may have a valence of 2. That is, the precursor of the second metal may be a precursor of one or two or more metals selected among the transition metals, and be a precursor of the transition metal having an oxidation number of 2.

In the preparation method for a lithium composite phosphate-based compound according to the exemplary embodiment of the present invention, the first metal may include lithium, and the second metal may include iron. The lithium composite phosphate-based compound satisfying Chemical Formula 1 or 1-1 as described above may be prepared by the preparation method according to the exemplary embodiment of the present invention in which the first metal includes lithium and the second metal includes iron.

In the preparation method for a lithium composite phosphate-based compound according to the exemplary embodiment of the present invention, the precursor of the first metal may be a precursor of lithium, wherein the precursor of lithium may be a water-insoluble precursor of lithium or a water-soluble precursor of lithium. As a substantial example, the precursor of lithium may include lithium phosphate, lithium carbonate, lithium nitrate, lithium sulfate, lithium acetate, lithium citrate, lithium chloride, lithium hydrate, lithium hydroxide, lithium sulfite, lithium fluoride, lithium bromide, lithium iodide, or mixtures thereof.

In the preparation method for a lithium composite phosphate-based compound according to the exemplary embodiment of the present invention, the water-insoluble precursor of the second metal may be a water-insoluble precursor of iron, and as a substantial example, the water-insoluble precursor of iron may include iron oxalate, iron acetate, iron nitrate, an iron metal, iron oxides (including FeO, $Fe_2O_3$, and $Fe_3O_4$), or mixtures thereof. An average particle size of the water-insoluble precursor of iron may be 1 µm to 50 µm, specifically, 1 µm to 30 µm, and more specifically, 3 µm to 18 µm.

In the preparation method for a lithium composite phosphate-based compound according to the exemplary embodiment of the present invention, iron of the water-insoluble precursor of iron may have an oxidation number of 2. That is, the water-insoluble precursor of iron may include a divalent precursor of iron that is not dissolved in the polar solvent.

In the preparation method for a lithium composite phosphate-based compound according to the exemplary embodiment of the present invention, as the precursor of phosphate, any water-soluble precursor of phosphate may be used as long as it is generally used to prepare a phosphate-based compound, wherein the water-soluble precursor of phosphate may include ammonium phosphate, phosphoric acid, or mixtures thereof.

In the preparation method for a lithium composite phosphate-based compound according to the exemplary embodiment of the present invention, as the precursor of phosphate, a water-soluble precursor of a third metal (M of Chemical Formula 1) corresponding to one or more metals selected among Mg, Ni, Co, Mn, Ti, Cr, Cu, V, Ce, Sn, Ba, Ca, Sr, Zn, Al, and Ag may be further injected into the polar solvent.

In the preparation method for a lithium composite phosphate-based compound according to the exemplary embodiment of the present invention, the third metal may be one or two or more metals selected among transition metals including Ni, Co, Mn, Ti, Cr, Cu, V, Zn, and Ag; and alkali earth metals including Ca, Sr, Ba, and Mg; the third metal may be one or two or more metals selected among the transition metals including Ni, Co, Mn, Ti, Cr, Cu, V, Zn, and Ag; or the third metal may be one or two or more metals selected from the alkali earth metals including Ca, Sr, Ba, and Mg.

In the preparation method according to the exemplary embodiment of the present invention, the water-soluble precursor of the third metal may be a precursor of the third metal, which is dissolved in the polar solvent including water. A substantial example, the water-soluble precursor (including the water-soluble precursor of the third metal) may include a precursor having a water-solubility of 1 g or more, more substantially, 10 g or more, and further more substantially, 53 g or more, based on 100 g of water at room temperature (25° C.) and normal pressure (1 atm).

In the preparation method according to the exemplary embodiment of the present invention, the water-soluble precursor of the third metal may be a salt (including a hydrate) containing the third metal, which is dissolved in the polar solvent including water, or a complex in which an organic ligand is coordinated with the third metal. As a substantial example, the water-soluble precursor of the third metal may include one or two or more materials selected among phosphates, carbonates, nitrates, sulfates, acetates, citrates, chlorides, hydroxides, sulfites, fluoride salts, chloride salts, bromide salts, and iodide salts of the third metal, and hydrates thereof.

In the preparation method for a lithium composite phosphate-based compound according to the exemplary embodiment of the present invention, the lithium composite phosphate-based compound may satisfy the following Chemical Formula 1, more specifically, the following Chemical Formula 1-1. Here, the water-soluble or water-insoluble precursor of lithium (the precursor of the first metal), the water-insoluble precursor of iron (the precursor of the second metal), the precursor of phosphate, the water-soluble precursor of the third metal (M) may be weighed so as to satisfy the composition represented by the following Chemical Formula 1 or 1-1 to thereby be injected into the polar solvent.

$$Li_{1+a}Fe_{1-x}M_xP_{1+b}O_4 \qquad \text{(Chemical Formula 1)}$$

In Chemical Formula 1, M is one or more selected from the group consisting of Mg, Ni, Co, Mn, Ti, Cr, Cu, V, Ce, Sn, Ba, Ca, Sr, Zn, Al, and Ag, and x, a, and b are real numbers satisfying 0.00≤x≤1, 0.00≤a≤0.10, and 0.00≤b≤0.10, respectively.

$$Li_{1+a}Fe_{1-x}M_xP_{1+b}O_4 \qquad \text{(Chemical Formula 1-1)}$$

In Chemical Formula 1-1, M is one or more selected from the group consisting of Mg, Ni, Co, Mn, Ti, Cr, Cu, V, Ce, Sn, Ba, Ca, Sr, Zn, Al, and Ag, and x, a, and b are real numbers satisfying 0.00≤x<1, 0.00≤a≤0.10, and 0.00≤b≤0.10, respectively.

In the preparation method for a lithium composite phosphate-based compound according to the exemplary embodiment of the present invention, when the lithium composite phosphate-based compound is defined by Chemical Formula 1 or 1-1, the third metal (M) may be one or two or more metals selected among transition metals including Ni, Co, Mn, Ti, Cr, Cu, V, Zn, and Ag; and alkali earth metals including Ca, Sr, Ba, and Mg; the third metal (M) may be one or two or more metals selected among the transition metals including Ni, Co, Mn, Ti, Cr, Cu, V, Zn, and Ag; or the third metal (M) may be one or two or more metals selected from the alkali earth metals including Ca, Sr, Ba, and Mg.

In the preparation method for a lithium composite phosphate-based compound according to the exemplary embodiment of the present invention, the water-soluble or water-insoluble precursor of lithium may be injected into the polar solvent so that a molar concentration of lithium in the polar solvent is 1 to 25 mol/L after the chelating agent is injected into and dissolved in the polar solvent. In this case, as described above, the water-insoluble precursor of iron and the precursor of phosphate, and selectively, the precursor of the third metal (M) may be injected into the polar solvent together with the water-soluble or water-insoluble precursor of lithium so as to satisfy Chemical Formula 1.

In the preparation method for a metal phosphate according to the exemplary embodiment of the present invention, stirring may be performed at room temperature for 1 to 30 hours, specifically, 12 to 30 hours, and more specifically, 16 to 30 hours.

In the preparation method for a lithium composite phosphate-based compound according to the exemplary embodiment of the present invention, concentration and drying may be performed by vacuum concentration.

In the preparation method for a lithium composite phosphate-based compound according to the exemplary embodiment of the present invention, a colloidal suspension may be prepared by concentrating the polar solvent containing the chelating agent, the precursor of phosphate, the precursor of the first metal, and the water-insoluble precursor of the second metal by vacuum concentration, and in a case in which the stirring is performed for a long period of time (16 hours or more), the colloidal suspension may be prepared during the stirring.

In the preparation method for a lithium composite phosphate-based compound according to the exemplary embodiment of the present invention, concentration and drying may be continuously performed.

Concentration and drying are continuously performed, which means that concentration and drying are continuously performed by vacuum concentration under constant temperature and pressure conditions, that is, concentration and drying are performed by a single vacuum concentration step.

In a case in which concentration and drying are continuously performed, vacuum concentration may be performed at a temperature of 30° C. to 60° C. and a pressure of 20 to 100 mbar. In this case, as a substantial example, vacuum concentration (that is, concentration and drying) may be performed for 3 to 24 hours.

In the preparation method for a lithium composite phosphate-based compound according to the exemplary embodiment of the present invention, concentration and drying may be discontinuously performed.

Concentration and drying are discontinuously performed, which means that concentration is performed by vacuum concentration under constant temperature and pressure conditions and then drying is performed by vacuum concentration under temperature and pressure conditions different from those at the time of concentration, that is, concentration and drying are performed, respectively, by a two-step vacuum concentration step.

In a case in which concentration and drying are discontinuously performed, concentration may be performed at a temperature of 30° C. to 60° C. and a pressure of 20 to 100 mbar, and drying may be performed at a temperature of 30° C. to 60° C. and a pressure of 20 to 100 mbar, independently of concentration conditions. In this case, as a substantial example, concentration may be performed for 3 to 24 hours, and drying may be performed for 3 to 24 hours.

In the preparation method for a lithium composite phosphate-based compound according to the exemplary embodiment of the present invention, the precursor powder obtained by drying may contain a complex of the second metal having a valence of 3. In detail, when the water-insoluble precursor of the second metal is a divalent precursor of iron, the precursor powder may contain a trivalent complex of iron.

In the preparation method for a lithium composite phosphate-based compound according to the exemplary embodiment of the present invention, there is no FT-IR peak by the water-insoluble precursor of the second metal on a FT-IR absorption spectrum of the precursor powder, but there is a peak of the complex in which at least the chelating agent and iron are bonded to each other, and iron in the complex may have a valence (oxidation number) of +3. The complex of iron, having a valence of +3 may be formed during the stirring or vacuum concentration step.

In the preparation method for a lithium composite phosphate-based compound according to the exemplary embodiment of the present invention, a crushing step of crushing the precursor powder obtained by drying may be further performed, wherein the crushing step may be performed using a general dry or wet crushing method.

In the preparation method for a lithium composite phosphate-based compound according to the exemplary embodiment of the present invention, heat-treatment of the powder obtained by drying may be performed under a reduction atmosphere or an inert atmosphere. The reduction atmosphere includes a pure hydrogen atmosphere; or a mixed gas atmosphere in which 3 to 10 vol % of hydrogen, and inert gas are mixed with each other. In this case, hydrogen or the mixed gas may be supplied at 100 to 500 cc/min.

In the preparation method for a lithium composite phosphate-based compound according to the exemplary embodiment of the present invention, heat-treatment may be performed at 400° C. to 800° C.

In the preparation method for a lithium composite phosphate-based compound according to the exemplary embodiment of the present invention, a crushing step of crushing the powder obtained by heat-treatment may be further performed, wherein the crushing step may be performed using a general dry crushing method.

Preparation Example 1

After preparing an aqueous solution in which 10 wt % of citric acid was dissolved, lithium phosphate ($Li_3PO_4$, 99%), iron oxalate ($FeC_2O_4 \cdot 2H_2O$, 99%), and ammonium phosphate (($NH_4)_2HPO_4$, 98%) were weighed and injected into 250 mL of the aqueous solution so that a molar ratio of Li:Fe:$PO_4$ was 1.06:1:1.01 and a molar concentration of lithium ion in the aqueous solution was 23.8 M, followed by stirring at room temperature for 21 hours, thereby preparing a precursor solution.

After injecting the prepared precursor solution in a vacuum concentrator, the precursor solution was vacuum concentrated and dried at 40° C. and a pressure of 28 mbar for 12 hours, thereby obtaining precursor powder.

The obtained precursor powder was heat-treated at 650° C. for 10 hours while supplying hydrogen at 150 cc/min, thereby preparing lithium-iron phosphate.

After crushing the prepared lithium-iron phosphate, 90 wt % of lithium-iron phosphate, 5 wt % of a conducting agent (Super-p+ vapor growth carbon fiber (VGCF), 1:1 (weight ratio)), and 5 wt % of a binder (polyvinylidene fluoride (PVdF)) were mixed with each other, and active material slurry was prepared using N-methyl-pyrrolidone (NMP) as a solvent.

The prepared active material slurry was applied and dried onto aluminum foil having a thickness of 17 μm, compacted using a press, and dried at 120° C. for 16 hours under vacuum, thereby manufacturing an electrode as a circular plate having a diameter of 12 mm. In this case, an electrode density of the electrode was 1 to 2 g/cc.

As a counter electrode, lithium metal foil punched to have a diameter of 16 mm was used, and as a separator, a polypropylene (PP) film was used. As the electrolyte, 1M of $LIPF_6$ in a mixed solution of ethylene carbonate (EC)/ethyl methyl carbonate (EMC) (1:2 (v/v)) was used. After the separator was impregnated with the electrolyte, the separator was inserted between a work electrode and the counter electrode, and evaluation was performed using a case made of a steel use stainless (SUS) material as a test cell for evaluating the electrode.

Preparation Example 2

Lithium-iron-magnesium phosphate and a test cell were prepared by the same methods as in Example 1 except for injecting $Mg(CH_3COO)_2 \cdot 4H_2O$ together with lithium phosphate ($Li_3PO_4$, 99%), iron oxalate ($FeC_2O_4 \cdot 2H_2O$, 99%), and ammonium phosphate (($NH_4)_2HPO_4$, 98%) into an aqueous solution in which citric acid was dissolved so that a molar ratio of $Li:Fe:Mg:PO_4$ was 1.06:0.98:0.02:1.01.

Preparation Example 3

Lithium-iron-silver phosphate and a test cell were prepared by the same methods as in Example 1 except for injecting $AgCH_3COO$ together with lithium phosphate ($Li_3PO_4$, 99%), iron oxalate ($FeC_2O_4 \cdot 2H_2O$, 99%), and ammonium phosphate (($NH_4)_2HPO_4$, 98%) into an aqueous solution in which citric acid was dissolved so that a molar ratio of $Li:Fe:Ag:PO_4$ was 1.06:0.98:0.02:1.01.

Preparation Example 4

Lithium-iron-nickel phosphate and a test cell were prepared by the same methods as in Example 1 except for injecting $Ni(CH_3COOH)_2 \cdot 4H_2O$ together with lithium phosphate ($Li_3PO_4$, 99%), iron oxalate ($FeC_2O_4 \cdot 2H_2O$, 99%), and ammonium phosphate (($NH_4)_2HPO_4$, 98%) into an aqueous solution in which citric acid was dissolved so that a molar ratio of $Li:Fe:Ni:PO_4$ was 1.06:0.98:0.02:1.01.

The following Table 1 illustrates electrical conductivities, BET specific surface areas, pore volumes, and carbon contents of lithium composite phosphate-based compounds prepared in Preparation Examples 1 to 4, and as Comparative Example, characteristics of $LiFePO_4$ having an average particle size of 100 to 300 nm, which was a commercial product, were measured and illustrated in Table 1. In Comparative Example, a test cell was manufactured by the same method as in Preparation Example 1 except for changing the cathode active material.

The electrical conductivity was measured using Loresta Equipment (Mitsubishi), the BET specific surface area was measured using Tristar 3000 (Micromeritics Instruments Corp.), the pore volume was measured using Tristar 3000 (Micromeritics Instruments Corp.), and the carbon content was measured using an EA 1108 CHNS—O analyzer (Fisons Instruments).

TABLE 1

| sample | Electrical Conductivity [$Scm^{-1}$] | BET [$m^2g^{-1}$] | Pore Volume [$cm^3g^{-1}$] | Carbon (wt %) |
|---|---|---|---|---|
| Commercial Product | $2.354 * 10^{-2}$ | 13.8789 | 0.031763 | 2.44 |
| Preparation Example 1 | $2.812 * 10^{-5}$ | 36.3615 | 0.152995 | 4.20 |
| Preparation Example 2 | $1.505 * 10^{-4}$ | 42.3995 | 0.180198 | 3.10 |
| Preparation Example 3 | $7.492 * 10^{-5}$ | 33.0205 | 0.140512 | 2.73 |
| Preparation Example 4 | $1.216 * 10^{-5}$ | 38.6603 | 0.157107 | 2.90 |

Figure 1:
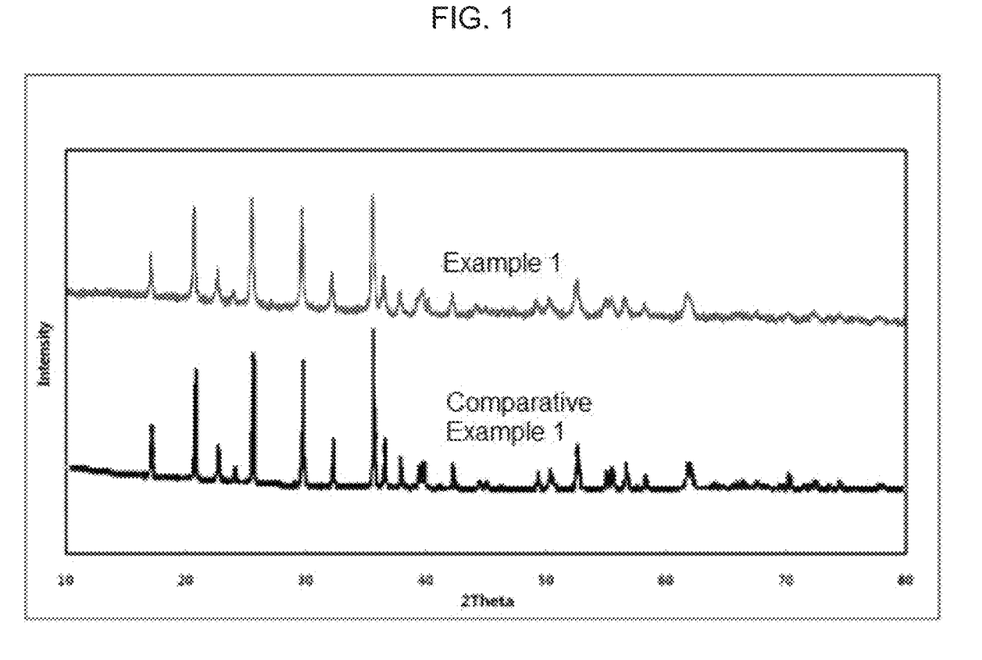
FIG. 1 is a view illustrating an X-ray diffraction (XRD) pattern of a lithium composite phosphate-based compound prepared according to Example of the present invention.

FIG. 1 is a view illustrating X-ray diffraction (XRD) characteristics of lithium composite phosphate-based compounds prepared according to Preparation Example 2 and the commercial product corresponding to Comparative Example. As illustrated in FIG. 1, it may be appreciated that lithium iron magnesium phosphate having an olivine structure was prepared.

Figure 2A:
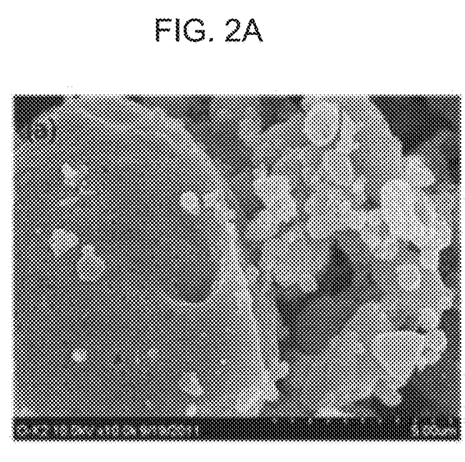
FIGS. 2A to 2D are views illustrating results obtained by observing lithium composite phosphate-based compounds prepared according to Examples of the present invention using a high-magnification scanning electron microscope (SEM).
Figure 2B:
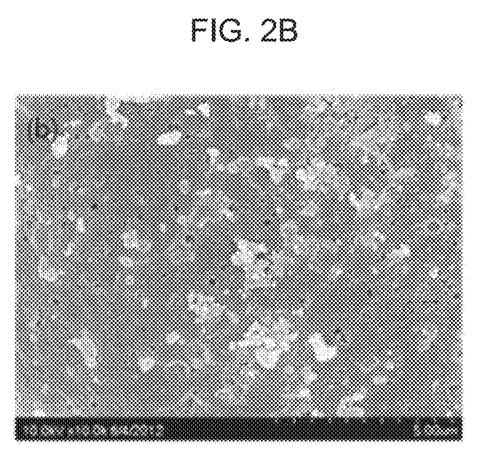
Figure 2C:
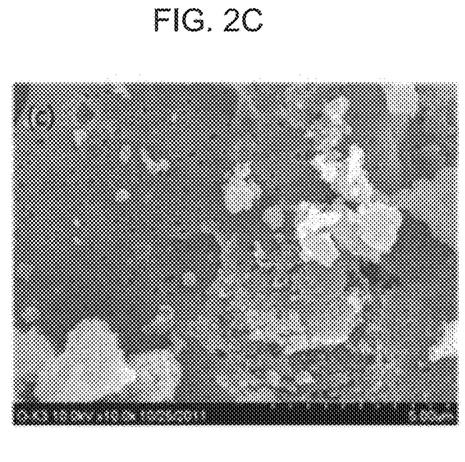
Figure 2D:
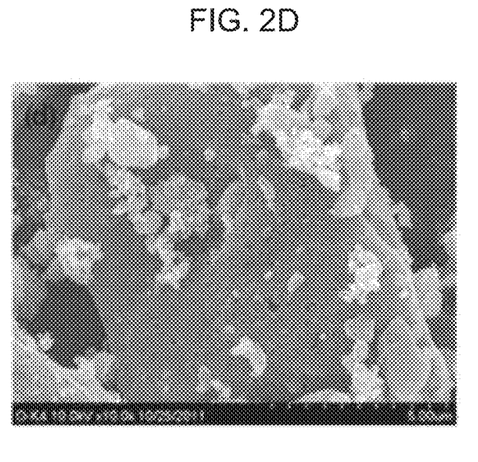

FIGS. 2A to 2D are high-magnification scanning electron microscope (SEM) photographs of lithium composite phosphate-based compounds obtained after heat-treatment under a hydrogen atmosphere in Preparation Examples 1 to 4, wherein FIG. 2A illustrates a result of Preparation Example 1, FIG. 2B illustrates a result of Preparation Example 2, FIG. 2C illustrates a result of Preparation Example 3, and FIG. 2D illustrates a result of Preparation Example 4. As results of SEM observation and XRD pattern analysis of transmission electron microscope, it may be appreciated that lithium composite phosphate-based compounds having open pores formed in primary particles themselves were obtained.

Figure 3A:
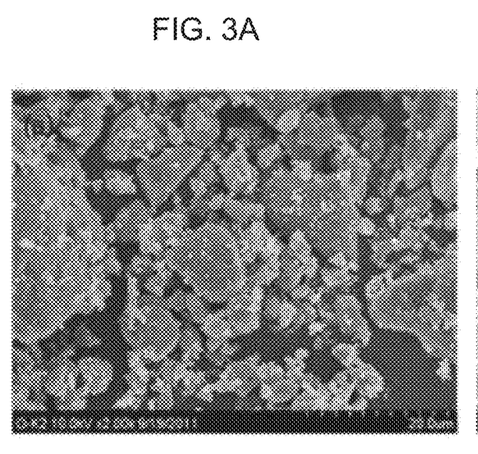
FIGS. 3A to 3D are views illustrating results obtained by observing the lithium composite phosphate-based compounds prepared according to the Examples of the present invention using a low-magnification scanning electron microscope (SEM).
Figure 3B:
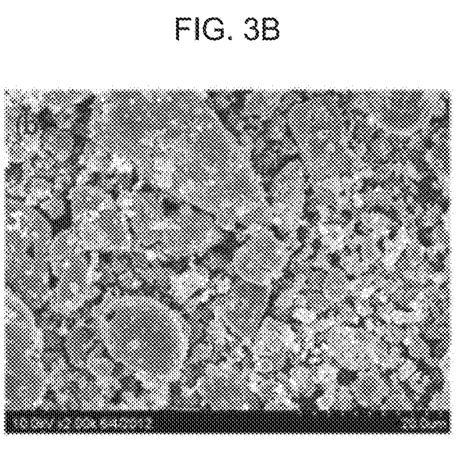
Figure 3C:
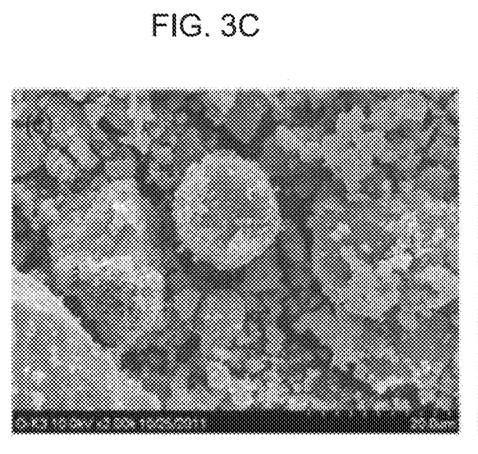
Figure 3D:
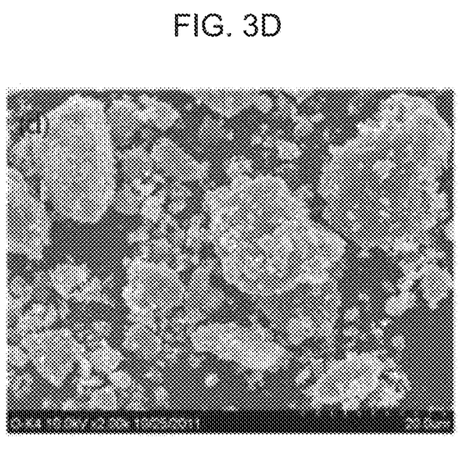

FIGS. 3A to 3D are low-magnification scanning electron microscope (SEM) photographs of the lithium composite phosphate-based compounds obtained after heat-treatment under a hydrogen atmosphere in Preparation Examples 1 to 4, wherein FIG. 3A illustrates a result of Preparation Example 1, FIG. 3B illustrates a result of Preparation Example 2, FIG. 3C illustrates a result of Preparation Example 3, and FIG. 3D illustrates a result of Preparation Example 4. As a result of SEM observation, it may be appreciated that porous lithium composite phosphate-based compound particles having a particle diameter of 1 μm to 200 μm, which were significantly coarse, were prepared.

Figure 4:
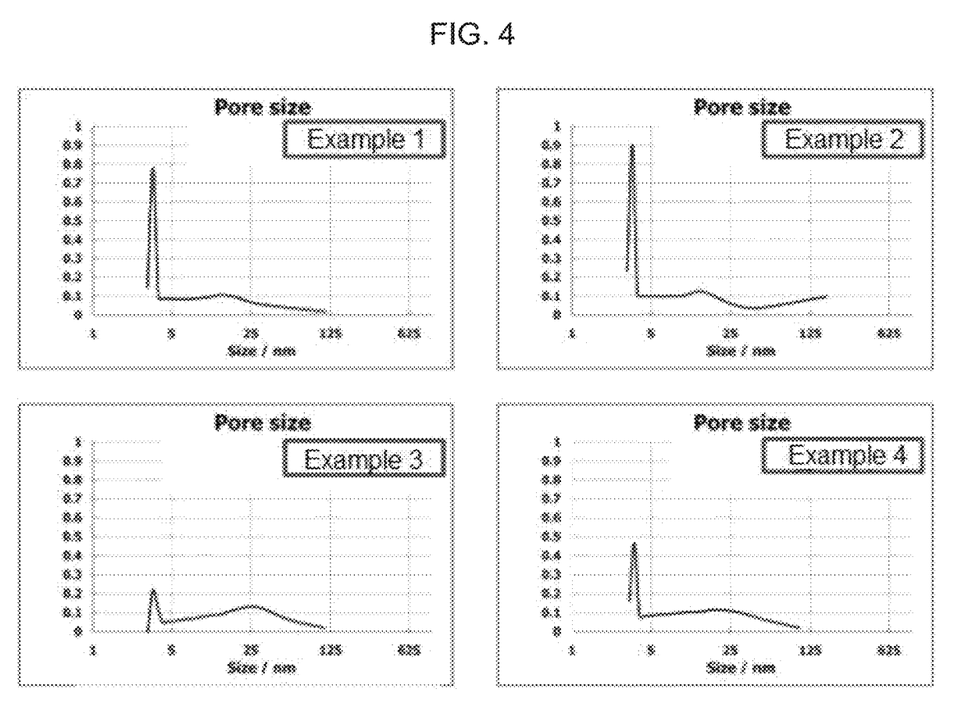
FIG. 4 is a view illustrating results obtained by measuring pore distribution of the lithium composite phosphate-based compounds prepared according to the Example of the present invention.

As a result of measuring an average particle size, pore distribution of the lithium composite phosphate-based compounds obtained after heat-treatment under a hydrogen atmosphere in Preparation Examples 1 to 4 was illustrated in FIG. 4. As illustrated in FIG. 4, it may be appreciated that the lithium composite phosphate-based compounds had pores having a bimodal size distribution, including a nano pore having an average pore size of 3 to 4 nm and a sub-micro pore having an average pore size of 10 to 25 nm.

Figure 5A:
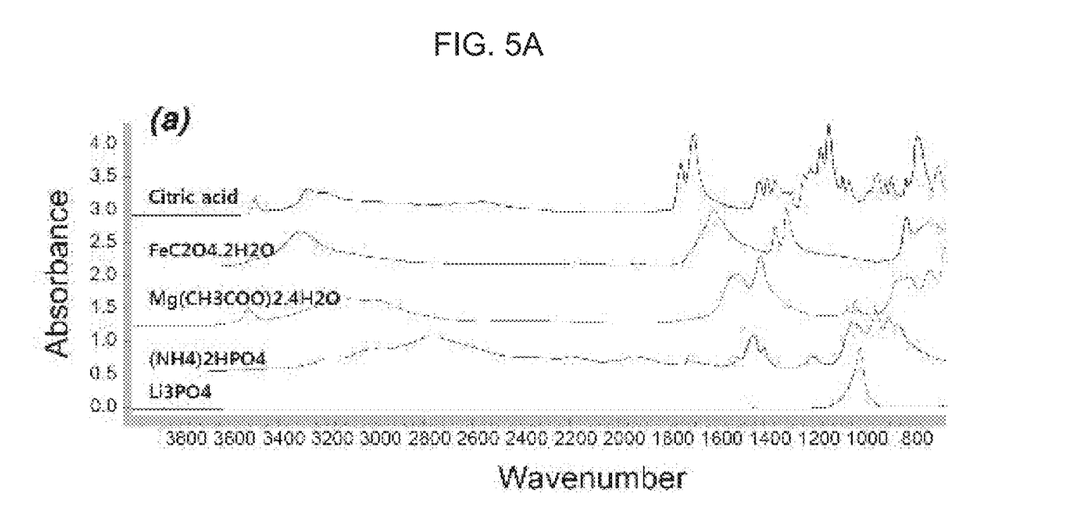
FIGS. 5A and 5B are views illustrating Fourier transform-infrared (FT-IR) spectra of precursor powder and the lithium composite phosphate-based compound prepared according to the Example of the present invention.
Figure 5B:
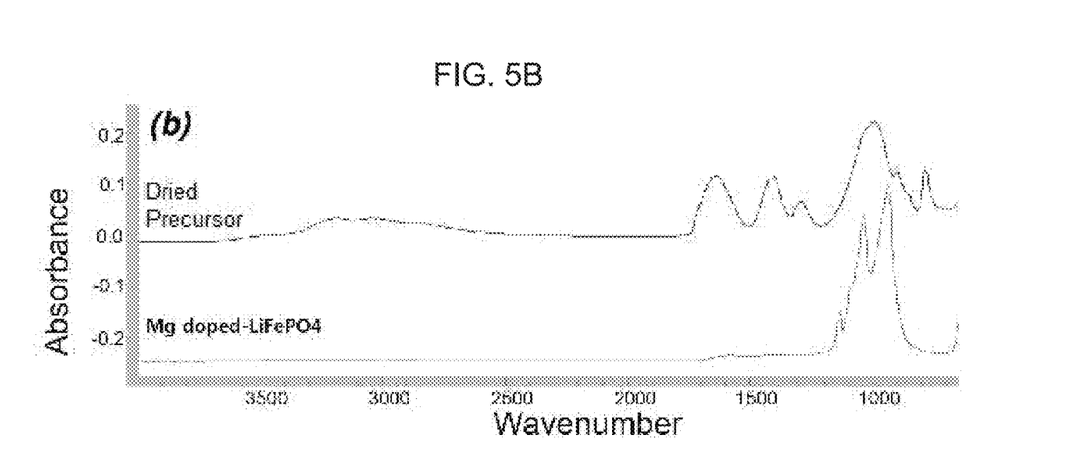

FIG. 5A is a view illustrating Fourier transform-infrared (FT-IR) spectra of each of the raw materials used in Preparation Example 2 and FIG. 5B is a view illustrating Fourier transform-infrared (FT-IR) spectra of the dried precursor and the prepared lithium composite phosphate-based compound (Mg doped-$LiFePO_4$ in FIG. 5). As illustrated in FIGS. 5A and 5B, it may be appreciated that a peak by a ferrous oxalate complex (iron oxalate) disappeared and a peak by a ferric ammonium citrate complex was formed in the dried precursor.

Figure 6:
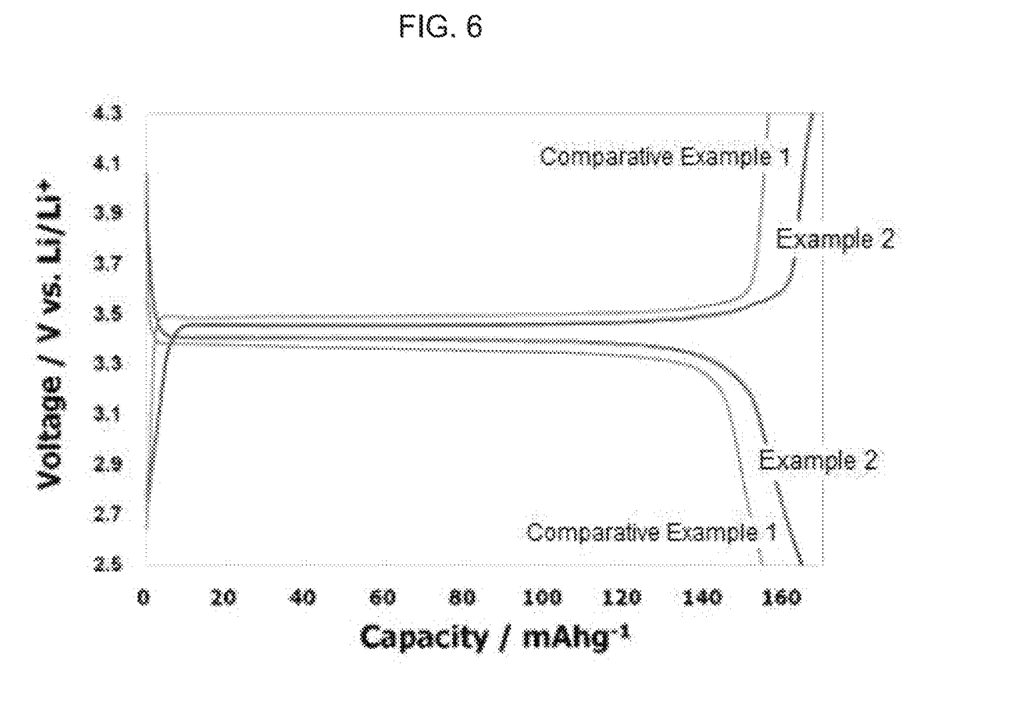
FIG. 6 is a view showing charge and discharge characteristics of a cell manufactured according to the Example of the present invention.

FIG. 6 is a view showing charge and discharge characteristics (4.3V-2.5V, 0.1 C) of the test cell manufactured in Preparation Example 2 and the test cell manufactured using the commercial product. It may be appreciated that in the commercial product, the test cell had discharge capacity of 154 ($mAhg^{-1}$), but the cell containing the lithium composite phosphate-based compound according to the present invention as the active material had discharge capacity of 165 ($mAhg^{-1}$).

Figure 7:
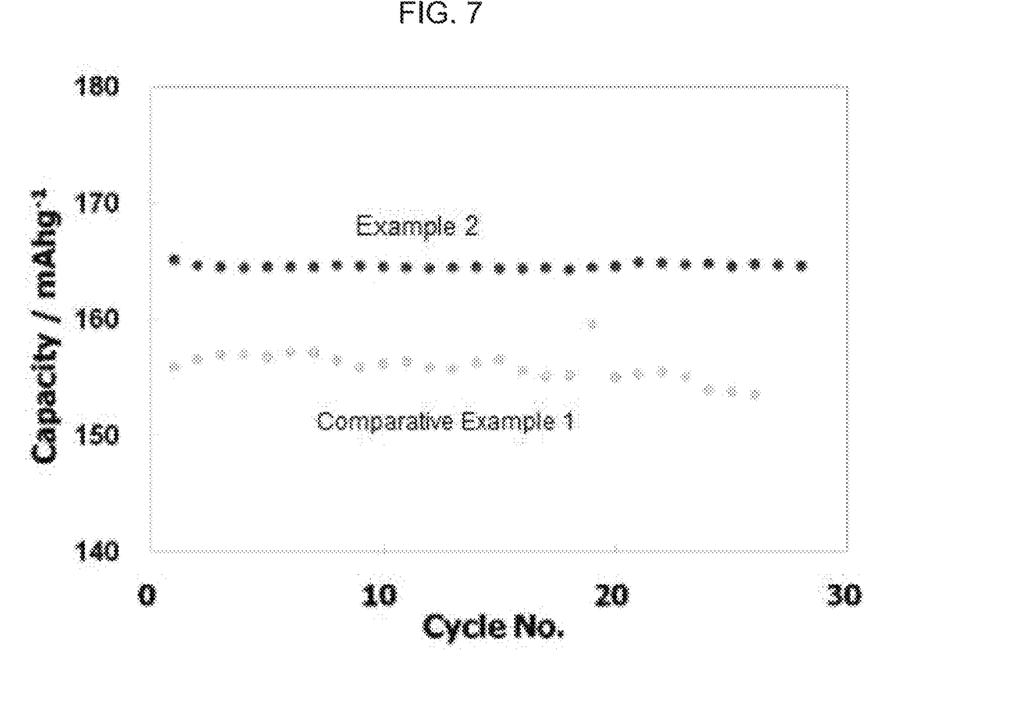
FIG. 7 is a view showing charge and discharge cycle characteristics of the cell manufactured according to the Example of the present invention.

FIG. 7 is a view showing charge and discharge cycle characteristics (4.3V-2.5V, 0.1 C, 28 cycles repeated) of the test cell manufactured in Preparation Example 2 and the test cell manufactured using the commercial product. It may be appreciated that in the commercial product, a change in battery capacity ($mAhg^{-1}$) at the 25th cycle, based on battery capacity ($mAhg^{-1}$) at the 1st cycle (battery capacity at the 25th cycle/battery capacity at the 1st cycle×100%) was 98.09%, and in the test cell according to the present invention, the change in battery capacity was 99.95%.

Hereinabove, although the present invention is described by specific matters, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described embodiments, and the following claims as well as all modified equally or equivalently to the claims are intended to fall within the scope and spirit of the invention.

The invention claimed is:

1. A preparation method for a lithium composite phosphate-based compound, the preparation method comprising:
   a) injecting and stirring at least a chelating agent, a precursor of phosphate, a precursor of a first metal including lithium, and a water-insoluble precursor of a second metal in a polar solvent to prepare a precursor dispersion solution, wherein the water-insoluble precursor of a second metal has a water-solubility of 0.034 g or less based on 100 g of water at 25° C. and 1 atm; and
   b) heat-treating precursor powder obtained by concentrating and drying the precursor dispersion solution.

2. The preparation method of claim 1, wherein the second metal is one or two or more metals selected among transition metals, and in the water-insoluble precursor of the second metal, the second metal has a valence of 2.

3. The preparation method of claim 2, wherein the precursor powder contains a complex of the second metal having a valence of 3.

4. The preparation method of claim 2, wherein the lithium composite phosphate-based compound satisfies a composition represented by the following Chemical Formula 1:

$$Li_{1+a}Fe_{1-x}M_xP_{1+b}O_4 \qquad \text{Chemical Formula 1}$$

wherein in Chemical Formula 1, M is one or more selected from the group consisting of Mg, Ni, Co, Mn, Ti, Cr, Cu, V, Ce, Sn, Ba, Ca, Sr, Zn, Al, and Ag, and x, a, and b are real numbers satisfying $0.00<x<1$, $0.00<a<0.1$, and $0.00<b<0.10$, respectively.

5. The preparation method of claim 1, wherein the precursor of the first metal is a water-soluble precursor or a water-insoluble precursor.

6. The preparation method of claim 1, wherein the second metal includes iron.

7. The preparation method of claim 1, wherein a water-soluble precursor of a third metal, one or more metals selected among Mg, Ni, Co, Mn, Ti, Cr, Cu, V, Ce, Sn, Ba, Ca, Sr, Zn, Al, and Ag is further injected into the polar solvent.

8. The preparation method of claim 1, wherein the concentration and drying are performed by vacuum concentration.

9. The preparation method of claim 8, wherein the vacuum concentration is performed at a temperature of 30 to 60° C. and a pressure of 20 to 100 mbar.

10. The preparation method of claim 1, wherein the heat-treatment is performed under a reduction atmosphere or an inert atmosphere.

11. The preparation method of claim 10, wherein the heat-treatment is performed at 400 to 800° C.

* * * * *